Feb. 8, 1927.
C. W. CAFFEE
1,617,146
HOG CONVEYER FOR SCALDING TANKS
Filed Sept. 24, 1925  2 Sheets-Sheet 1
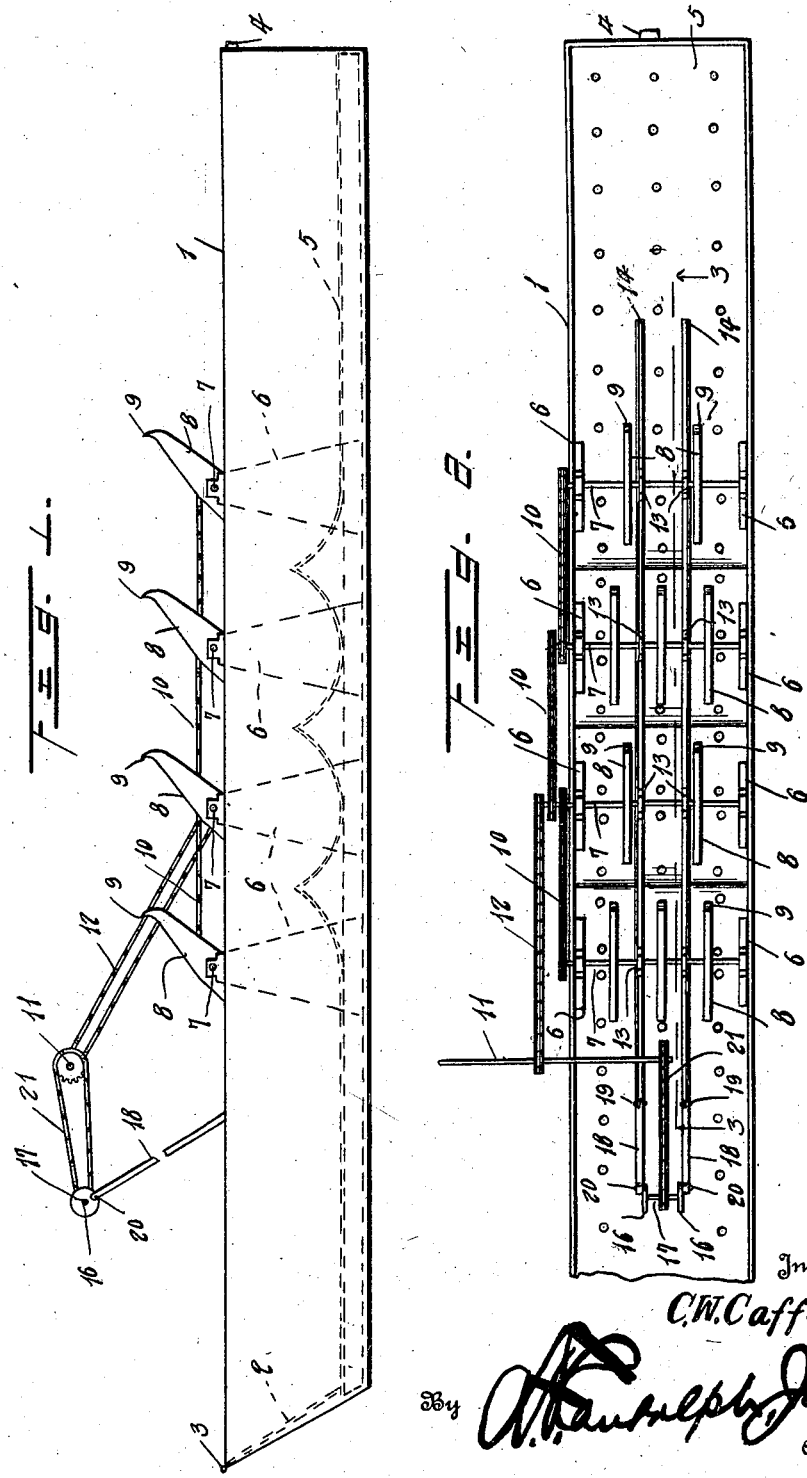

Feb. 8, 1927. 1,617,146
C. W. CAFFEE
HOG CONVEYER FOR SCALDING TANKS
Filed Sept. 24, 1925    2 Sheets-Sheet 2
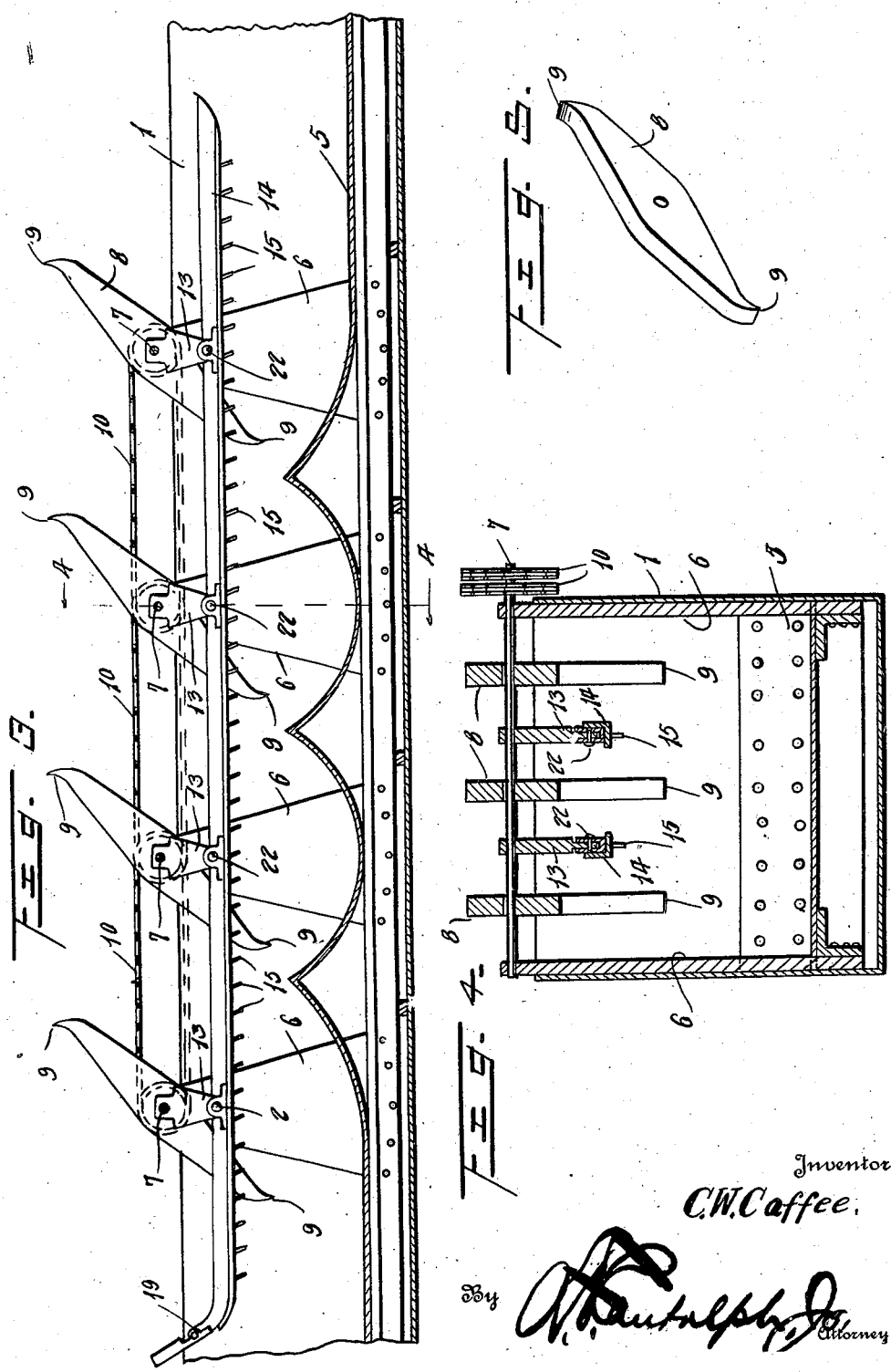
Inventor
C. W. Caffee.
By
Attorney Patented Feb. 8, 1927.

1,617,146

UNITED STATES PATENT OFFICE.

CAYWOOD W. CAFFEE, OF SOUTH OMAHA, NEBRASKA.

HOG CONVEYER FOR SCALDING TANKS.

Application filed September 24, 1925. Serial No. 58,403.

This invention relates to apparatus for conveying hogs to scalding tanks, and has for one of its objects the provision of a device of this character which shall include a plurality of rotating arms adapted to insure the constant movement of the hogs from the receiving to the delivery end of the tank.

A further object of the invention is the provision of an apparatus of the character stated which shall include means adapted to push the hogs beneath the surface of the scalding water in the tank several times during their passage from the receiving to the delivery end of the tank.

A still further object of the invention is the provision of an apparatus for conveying hogs through scalding tanks which shall be adapted to be supported on the tray of the tank to the end that the tray may be readily removed when it is desired to clean the tank and for other purposes.

With the above and other objects in view, the invention consists of the construction, combination and arrangement of parts hereinafter fully described and claimed, and illustrated in the accompanying drawings, wherein:

Figure 1 is a view in side elevation of a hog scalding tank equipped with a conveying apparatus embodying my invention;

Figure 2 is a top plan view of the scalding tank and conveying apparatus;

Figure 3 is a sectional view taken on the vertical plane indicated by the line 3—3 of Figure 2;

Figure 4 is a sectional view taken on the vertical plane indicated by the line 4—4 of Figure 3, and Figure 5 is a detail perspective view of one of the rotating arms of the conveying apparatus.

Corresponding and like parts are referred to in the following description and designated in the several views of the accompanying drawings by similar reference characters.

In the drawings 1 designates a well known form of a hog scalding tank which is provided at its receiving end with a guard 2 hinged at its upper end as at 3 and which is provided at its delivery end with an overflow spout 4. A tray 5 is arranged in the tank 1 and is adapted to be raised and lowered with respect thereto by an air hoist, not shown.

In accordance with my invention relatively spaced pairs of transversely alined standards 6 are secured to the tray 5. The standards 6 extend above the upper edges of the lateral sides of the tank 1, and journaled in said ends of the standards are shafts 7 which extend transversely of the tank and to which arms 8 are secured. The arms 8 are secured to the shafts 7 at points centrally between their ends, and are provided at their ends with oppositely curved sharpened ends 9. The arms 8 of one shaft are preferably arranged in planes located between the arms of an adjacent shaft, and certain of the shafts are provided with a greater number of arms than the others, as clearly shown in Figure 2. The shafts 7 are connected together for simultaneous rotation in the same direction by sprocket chains 10, and they are adapted to be driven from a shaft 11 by a sprocket chain 12.

During their rotation, the arms 8 pass through the scalding water in the tank 1 and insure the constant movement of the hogs from the receiving to the delivery end of the tank.

Hangers 13 are loosely mounted on the shafts 7 and support bars 14 which are preferably of angular formation in cross section and which are provided with downwardly and forwardly directed prongs 15. The bars 14 are connected to disks 16 fixed to a shaft 17 by means of rods 18 which are pivotally connected as at 19 to the bars 14 and eccentrically connected as at 20 to the disks 16. The shaft 17 is driven from the shaft 11 by means of a sprocket chain 21. Any suitable means, not shown, may be provided for supporting the shafts 11 and 17, and the bars 14 are preferably pivoted to the hangers 13 as shown at 22. The bars 14 will while in motion dip the floating hogs in the scalding water several times during their passage from the receiving to the delivery end of the tank 1.

From the foregoing description, taken in connection with the accompanying drawings, it will be seen that the arms 8 and the bars 14 are simultaneously operated with the result that the hogs will be simultaneously dipped and advanced in the direction of the delivery end of the tank 1. The sharpened ends 9 of the arms 8 and the prongs 15 of the bars 14, insure the firm engagement of these parts with the hogs. As the arms 8 constantly move all hogs, including the "sinkers" from the receiving to the delivery end of the tank 1, and as the bars 14 dip the floating hogs several times during passage from the receiving to the delivery end of the tank, it will be apparent that the device is highly efficient. That is to say it insures the uniform scalding of the hogs and prevents any loss as the result of the burning of the "sinkers". It will be further apparent that as the advancing and dipping means are solely carried by the tray, said means will not in any way interfere with raising of said tray.

While I have described the principle of operation of the invention, together with the device which I now consider to be the best embodiment thereof, I desire to have it understood that the device shown is merely illustrative, and that such changes may be made when desired as are within the scope of the invention as claimed.

What is claimed is:

1. In an apparatus of the character set forth, a tank, a tray removably positioned in the tank, standards secured to the tray, shafts journaled in the standards, hangers carried by the shafts, bars pivoted to the hangers and provided at their under-sides with downwardly and forwardly directed prongs, and operating means connected to the bars.

2. In an apparatus of the character set forth, a tank, rotating advancing elements, a reciprocating dipping element, and means for simultaneously operating the advancing and dipping elements.

3. In an apparatus of the character set forth, a tank, shafts, hangers carried by the shafts, dipping bars carried by the hangers, advancing arms fixed to the shafts, and means for simultaneously reciprocating the bars and rotating the advancing arms.

4. In an apparatus of the character set forth, a tank, shafts, hangers carried by the shafts, dipping bars carried by the hangers, advancing arms fixed intermediate their ends to the shafts, and means for simultaneously reciprocating the bars and rotating the advancing arms.

5. In an apparatus of the character set forth, a tank, shafts, hangers carried by the shafts, dipping bars carried by the hangers, advancing arms fixed intermediate their ends to the shafts and having oppositely directed sharpened ends, and means for simultaneously reciprocating the bars and rotating the advancing arms.

6. In an apparatus of the character set forth, a tank, a tray positioned in and removable from the tank, rotating advancing elements carried solely by the tray, a reciprocating dipping element carried solely by the tray, and means for simultaneously operating the advancing and dipping elements.

7. In an apparatus of the character set forth, a tank, a movable dipping bar, rotating advancing arms arranged at opposite sides of the bar, and means for simultaneously operating the bar and arms.

In testimony whereof I affix my signature.

CAYWOOD W. CAFFEE.